United States Patent
Kauffman

(10) Patent No.: US 12,436,080 B2
(45) Date of Patent: Oct. 7, 2025

(54) CALIBRATION SET INCLUDING NANOPARTICLES OF NYLON-6 AND DYES

(71) Applicant: CORNING INCORPORATED, Corning, NY (US)

(72) Inventor: Amy Claire Kauffman, Kittery, ME (US)

(73) Assignee: CORNING INCORPORATED, Corning, NY (US)

( * ) Notice: Subject to any disclaimer, the term of this patent is extended or adjusted under 35 U.S.C. 154(b) by 640 days.

(21) Appl. No.: 17/800,334

(22) PCT Filed: Feb. 3, 2021

(86) PCT No.: PCT/US2021/016351
§ 371 (c)(1),
(2) Date: Aug. 17, 2022

(87) PCT Pub. No.: WO2021/173312
PCT Pub. Date: Sep. 2, 2021

(65) Prior Publication Data
US 2023/0071520 A1 Mar. 9, 2023

Related U.S. Application Data

(60) Provisional application No. 62/980,653, filed on Feb. 24, 2020.

(51) Int. Cl.
*G01N 15/10* (2006.01)
*B82Y 15/00* (2011.01)
*B82Y 30/00* (2011.01)

(52) U.S. Cl.
CPC .......... *G01N 15/1012* (2013.01); *B82Y 15/00* (2013.01); *B82Y 30/00* (2013.01); *G01N 2015/1014* (2024.01)

(58) Field of Classification Search
CPC ....... G01N 15/1012; G01N 2015/1014; B82Y 15/00; B82Y 30/00
See application file for complete search history.

(56) References Cited

U.S. PATENT DOCUMENTS

| | | | |
|---|---|---|---|
| 5,093,234 A | 3/1992 | Schwartz | |
| 5,716,855 A | 2/1998 | Lerner et al. | |
| 6,074,879 A | 6/2000 | Zelmanovic et al. | |
| 6,269,957 B1 | 8/2001 | Bowers et al. | |
| 6,290,655 B1 | 9/2001 | Serpentino et al. | |
| 6,319,664 B1 | 11/2001 | Bookbinder et al. | |
| 6,326,157 B1 | 12/2001 | Nolan et al. | |
| 6,521,729 B1 | 2/2003 | Zelmanovic et al. | |
| 6,544,417 B1 | 4/2003 | Tortorella | |
| 8,696,952 B2 | 4/2014 | Kumacheva et al. | |
| 9,415,530 B2 | 8/2016 | Fukuda et al. | |
| 9,623,353 B2 | 4/2017 | Charkoudian et al. | |
| 10,072,161 B2 | 9/2018 | Margel et al. | |
| 10,429,302 B2 | 10/2019 | Nolan et al. | |
| 2006/0292095 A1 | 12/2006 | Biatry et al. | |
| 2008/0274540 A1 | 11/2008 | Minamoto et al. | |
| 2009/0078638 A1 | 3/2009 | Bonhomme et al. | |
| 2010/0119827 A1 | 5/2010 | Yang et al. | |
| 2011/0039354 A1 | 2/2011 | Hartman et al. | |
| 2011/0160328 A1 | 6/2011 | Deetz et al. | |
| 2013/0197319 A1 | 8/2013 | Monty et al. | |
| 2014/0017151 A1 | 1/2014 | Scott et al. | |
| 2016/0290911 A1 | 10/2016 | Hole et al. | |
| 2017/0322137 A1 | 11/2017 | Feher et al. | |
| 2018/0171484 A1 | 6/2018 | Kosvintsev | |
| 2018/0221823 A1 | 8/2018 | Nutalapati et al. | |
| 2019/0048139 A1 | 2/2019 | Zigmantas et al. | |
| 2019/0106542 A1 | 4/2019 | Chiu et al. | |
| 2021/0146316 A1 | 5/2021 | Dorin et al. | |
| 2021/0188903 A1 | 6/2021 | Wiklander et al. | |
| 2022/0040688 A1 | 2/2022 | Yagmur | |
| 2022/0074831 A1 | 3/2022 | Xu et al. | |

FOREIGN PATENT DOCUMENTS

| | | |
|---|---|---|
| AU | 2020212005 A1 | 8/2021 |
| CN | 105765364 A | 7/2016 |
| CN | 108103017 B | 10/2019 |
| EP | 0712426 A1 | 5/1996 |
| EP | 1031380 A2 | 8/2000 |

(Continued)

OTHER PUBLICATIONS

"Corning Filtration Guide", Internet Citation, Jan. 2013, pp. 1-18.
"Protein LoBind® Tubes", Retrieved from: https://online-shop.eppendorf.us/US-en/Laboratory-Consumables-44512/Tubes-44515/Protein-LoBind-Tubes-PF-56251.html, 2024, 4 pages.
"Thermo Scientific™ Low Protein Binding Collection Tubes", Retrieved from: https://www.fishersci.se/shop/products/thermo-scientific-low-protein-binding-collection-tubes-1-5-ml/15352617, 2024, 4 pages.
Vergauwen et al., "Confounding Factors of Ultrafiltration and Protein Analysis in Extracellular Vesicle Research", Scientific Report, vol. 7, No. 2704, 2017, 12 Pages.
Witwer, K.W., et al., "Standardization of sample collection, isolation and analysis methods in extracellular vesicle research", Journal of Extracellular Vesicles, 2013. 2(1): p. 20360.

(Continued)

*Primary Examiner* — Narayan K Bhat
(74) *Attorney, Agent, or Firm* — Chandra J. Duncan

(57) ABSTRACT

A calibration set includes first nanoparticles comprising nylon-6 covalently bound to a first dye, the first nanoparticles having a first average diameter and a first polydispersity index of greater than or equal to 1.15 and less than or equal to 1.19. The calibration set further includes second nanoparticles comprising nylon-6 covalently bound to a second dye that is different from the first dye, the second nanoparticles having a second average diameter and a second polydispersity index of greater than or equal to 1.15 and less than or equal to 1.19. The first average diameter is different from the second average diameter, the first average diameter and the second average diameter are each independently greater than or equal to 30 nm and less than or equal to 3000 nm, and the first average diameter is at least two times the second average diameter.

20 Claims, 1 Drawing Sheet

(56) References Cited

FOREIGN PATENT DOCUMENTS

| | | |
|---|---|---|
| EP | 1508804 A1 | 2/2005 |
| EP | 0887637 B1 | 9/2006 |
| EP | 2532716 A1 | 12/2012 |
| EP | 3337597 A1 | 6/2018 |
| EP | 3752552 A1 | 12/2020 |
| EP | 3794108 A1 | 3/2021 |
| JP | 10-306212 A | 11/1998 |
| KR | 10-2148298 B1 | 8/2020 |
| WO | 91/00509 A1 | 1/1991 |
| WO | 2007/127799 A2 | 11/2007 |
| WO | 2012/168440 A1 | 12/2012 |
| WO | 2013/059672 A1 | 4/2013 |
| WO | 2017/072360 A1 | 5/2017 |
| WO | 2018/145005 A1 | 8/2018 |
| WO | 2019/060980 A1 | 4/2019 |
| WO | 2019/104169 A1 | 5/2019 |
| WO | 2019/218077 A1 | 11/2019 |
| WO | 2020/127505 A1 | 6/2020 |
| WO | 2020/160220 A1 | 8/2020 |
| WO | 2020/161267 A1 | 8/2020 |
| WO | 2020/257710 A1 | 12/2020 |
| WO | 2021/055338 A1 | 3/2021 |
| WO | 2023/096739 A1 | 6/2023 |

OTHER PUBLICATIONS

Yamagishi H et al, "Evaluation of photochemically modified poly(arylsulfone) ultrafiltration membranes", Journal of Membrane Science, Elsevier BV, NL, vol. 105, No. 3, Sep. 1995, pp. 249-259.

Yáñez-Mó, M., et al., "Biological properties of extracellular vesicles and their physiological functions", Journal of Extracellular Vesicles, 2015. 4(1): p. 27066.

A. Pei, et al., "A New Strategy for the Preparation of Polyamide-6 Microspheres with Designed Morphology", Macromolecules, vol. 39 No. 23, 2006, pp. 7801-7804.

D. Crespy, et al., "Anionic Polymerization of e-Caprolactam in Miniemulsion: Synthesis and Characterization of Polyamide-6 Nanoparticles", Macromolecules, vol. 38 No. 16, 2005, pp. 6882-6887.

D. Crespy, et al., "Preparation of Nylon 6 Nanoparticles and Nanocapsules by Two Novel Miniemulsion/Solvent Displacement Hybrid Techniques", Macromolecular Chemistry and Physics, vol. 208 No. 5, 2007, pp. 457-466.

Evtushenko, et al., "Adsorption of extracellular vesicles onto the tube walls during storage in solution", PLOS One, 2020, vol. 15 No. 12: e0243738, pp. 16.

Gardiner et al., "Extracellular Vesicle Sizing And Enumeration By Nanoparticle Tracking Analysis", Journal of Extracellular Vesicles, vol. 2, Issue No. 1, Jan. 1, 2013, pp. 1-12.

H. Minami, et al., "Preparation of Nylon-6 Particles in Ionic Liquids", Macromolecular Symposia, vol. 288 No. 1, 2010, pp. 49-54.

International Search Report and Written Opinion of the International Searching Authority; PCT/US2021/016351; dated May 19, 2021; 10 pages; European Patent Office.

J.B. Simonsen, "A liposome-based size calibration method for measuring microvesicles by flow cytometry", Journal of Thrombosis and Haemostasis, vol. 14 No. 1, 2016, pp. 186-190.

J.B. Simonsen, et al., "Unique Calibrators Derived from Fluorescence-Activated Nanoparticle Sorting for Flow Cytometric Size Estimation of Artificial Vesicles: Possibilities and Limitations", Cytometry A, vol. 95(8), 2019, pp. 917-924.

K. Khezri, et al., "Application of nanoparticles in percutaneous delivery of active ingredients in cosmetic preparations", Biomedicine & Pharmacotherapy, vol. 106, 2018, pp. 1499-1505.

K. te Nijenhuis, et al., "A study on composites of Nylon-6 with hollow glass microspheres", Polymer Bulletin, vol. 21(5), 1989, pp. 467-474.

K. Vorauer-Uhl, et al., "Determination of liposome size distribution by flow cytometry", Cytometry, vol. 39(2), 2000, pp. 166-171.

L.A. Luzzi, et al., "Preparation and evaluation of the prolonged release properties of nylon microcapsules", Journal of Pharmaceutical Sciences, vol. 59(3), 1970, pp. 338-341.

O. Polonskyi, et al., "Nylon-sputtered nanoparticles: fabrication and basic properties", Journal of Physics D: Applied Physics, vol. 45(49), 2012, pp. 495301.

P. García-Manrique, et al., "Fully Artificial Exosomes: Towards New Theranostic Biomaterials", Trends in Biotechnology, vol. 36(1), 2018, pp. 10-14.

Protein LoBind® Tubes, https://online-shop.eppendorf.us/US-en/Laboratory-Consumables-44512/Tubes-44515/Protein-LoBind-Tubes-PF-56251.html, Retreived on Sep. 28, 2022.

S. Mordon, et al., "Site-specific methylene blue delivery to pilosebaceous structures using highly porous nylon microspheres: An experimental evaluation", Lasers in Surgery and Medicine, vol. 33(2), 2003, pp. 119-125.

S.L.N. Maas, et al., "Possibilities and limitations of current technologies for quantification of biological extracellular vesicles and synthetic mimics", Journal of Controlled Release, vol. 200, 2015, pp. 87-96.

Sedgwick, A.E. et al., "The biology of extracellular microvesicles", Traffic, 2018, vol. 19(5), pp. 319-327.

Thermo Scientific™ Low ProteinBinding Microcentrifuge Tubes(1.5 or 2 mL), https://www.fishersci.se/shop/products/thermo-scientific-low-protein-binding-collection-tubes-1-5-ml/15352617, Retreived on Sep. 28, 2022.

W.D. Gray, et al., "An accurate, precise method for general labeling of extracellular vesicles", MethodsX, vol. 2, 2015, pp. 360-367.

Witwer, K.W., et al., "Standardization of sample collection, isolation and analysis methods in extracellular vesicle research", Journal of Extracellular Vesicles, 2013, vol. 2(1), pp. 20360.

Yáñez-Mó, M., et al., "Biological properties of extracellular vesicles and their physiological functions", Journal of Extracellular Vesicles, 2015, vol. 4(1), pp. 27066.

Kimin et al: "Cyclic tangential flow filtration system for isolation of extracellular vesicles", APL Bioengineering, American Institute of Physics, 2 Huntington Quadrangle, vol. 5, No. 1, 2021, 11 pages.

Chinese Patent Application No. 202180016660.7 , Office Action dated May 31, 2025, 4 pages (English Translation only), Chinese Patent Office.

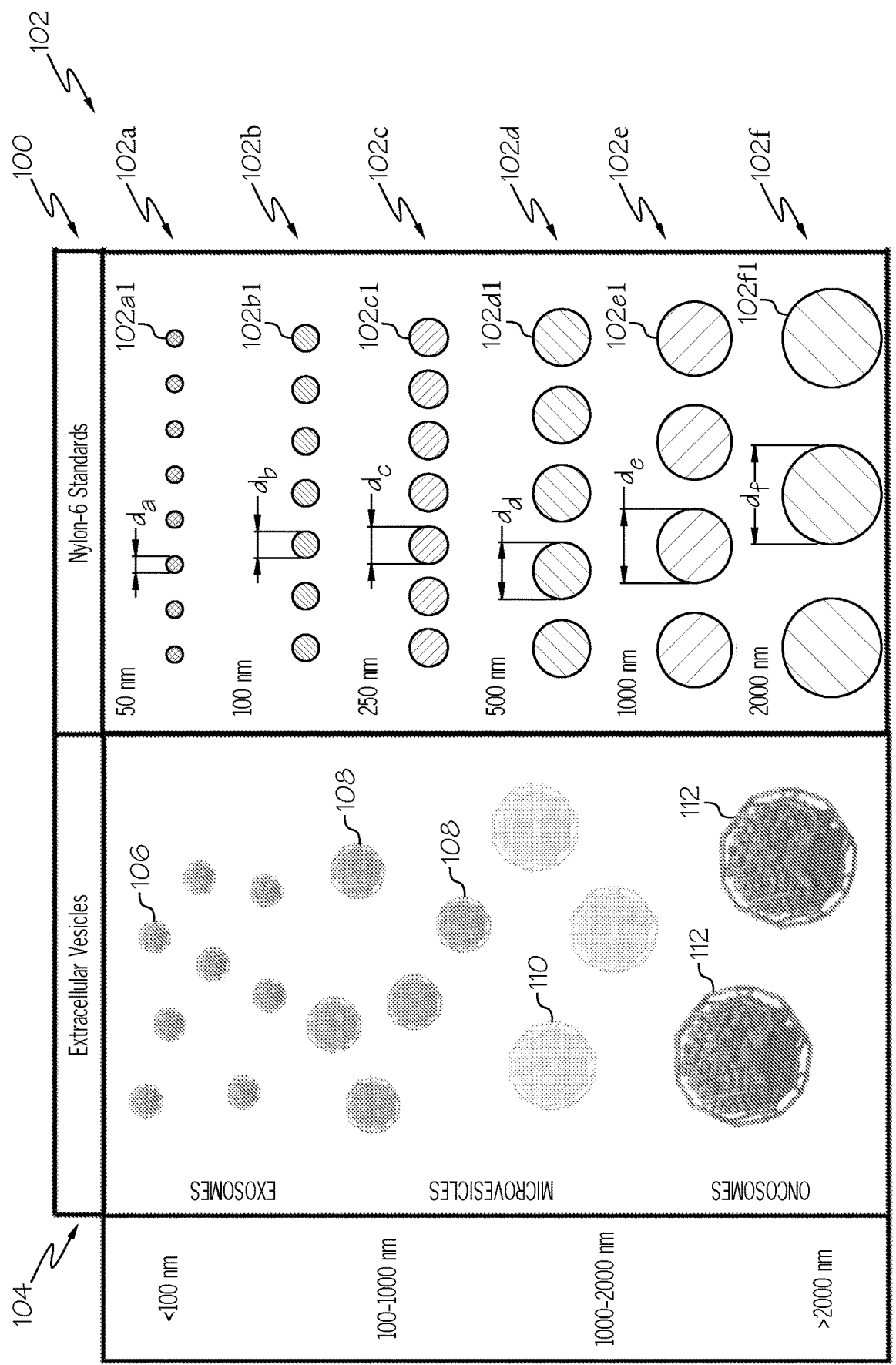

CALIBRATION SET INCLUDING NANOPARTICLES OF NYLON-6 AND DYES

CROSS-REFERENCE TO RELATED APPLICATIONS

This is a national stage application under 35 U.S.C. § 371 of International Application No. PCT/US2021/016351, filed Feb. 3, 2021, which claims the benefit of priority under 35 U.S.C. § 119 of U.S. Provisional Application Ser. No. 62/980,653 filed on Feb. 24, 2020, the content of which are relied upon and incorporated herein by reference in their entirety.

FIELD

The present specification generally relates to calibration sets and, more particularly, to calibration sets having properties similar to extracellular vesicles (EVs).

BACKGROUND

Extracellular vesicle (EV) research has expanded for both separation and concentration methods from serum and cells for therapeutic applications. The phrase "extracellular vesicle" generally refers to particles naturally released from a cell that are delimited by a lipid bilayer and cannot replicate. These particles can be subcategorized by size and function, with the smallest being exosomes as small as 30 nm and the largest being microvesicles as large as 2 µm.

However, characterization methods lack appropriate calibration standards for EV quantitation and sizing technologies. Although polystyrene bead standards are conventionally used in sizing instruments, such as flow cytometers, the polystyrene beads have properties that match those of mammalian cells, such as density, light scattering effects, size, and fluorescent marker binding affinity. Though EVs are products that may be of mammalian cell origin, their inherent properties differ from the properties of their origin cells and, thus, from the polystyrene beads.

Accordingly, a need exists for alternative calibration sets, and in particular, for calibration sets with properties similar to EVs.

SUMMARY

Various embodiments described herein provide a calibration set of nanoparticles having properties similar to EVs. In particular, the calibration set comprises first nanoparticles of nylon-6 covalently bound to a first dye and second nanoparticles of nylon-6 covalently bound to a second dye. The first nanoparticles have a first average diameter and the second nanoparticles have a second average diameter that is different from the first average diameter. The nanoparticles have a size range, density, and light scattering effects similar to those of EVs and can be used as a calibration standard for sizing and quantitation technologies, as will be described in greater detail below.

According to a first aspect disclosed herein, a calibration set comprises first nanoparticles comprising nylon-6 covalently bound to a first dye, the first nanoparticles having a first average diameter and a first polydispersity index of greater than or equal to 1.15 and less than or equal to 1.19; and second nanoparticles comprising nylon-6 covalently bound to a second dye that is different from the first dye, the second nanoparticles having a second average diameter and a second polydispersity index of greater than or equal to 1.15 and less than or equal to 1.19, wherein: the first average diameter is different from the second average diameter; the first average diameter and the second average diameter are each independently greater than or equal to 30 nm and less than or equal to 3000 nm; and the first average diameter is at least two times the second average diameter.

According to a second aspect disclosed herein, a calibration set comprises the calibration set according to the first aspect, wherein the first dye and the second dye each comprise a fluorescent lipophilic dye.

According to a third aspect disclosed herein, a calibration set comprises the calibration set according to any of the preceding aspects, wherein: the first dye comprises a first excitation maximum wavelength, λEx1; the second dye comprises a second excitation maximum wavelength, λEx2; λEx1; is different from λEx2; Ex2; and λEx1; and λEx2; are each from to 350 nm to 750 nm.

According to a fourth aspect disclosed herein, a calibration set comprises the calibration set according to any of the preceding aspects, wherein the calibration set comprises a container comprising a mixture including both the first nanoparticles and the second nanoparticles.

According to a fifth aspect disclosed herein, a calibration set comprises the calibration set according to any of the preceding aspects, wherein at least one of the first average diameter and the second average diameter is from 30 nm to 250 nm.

According to a sixth aspect disclosed herein, a calibration set comprises the calibration set according to any of the preceding aspects, wherein the first nanoparticles and the second nanoparticles each have a density of from 1.15 g/mL to 1.19 g/mL.

According to a seventh aspect disclosed herein, a calibration set comprises the calibration set according to any of the preceding aspects, wherein the first nanoparticles and the second nanoparticles each comprise RNA.

According to an eighth aspect disclosed herein, a method comprises: uniformly dispersing first nanoparticles and second nanoparticles in a calibration suspension, the first nanoparticles comprising nylon-6 covalently bound to a first dye, and the second nanoparticles comprising nylon-6 covalently bound to a second dye that is different from the first dye; adding a volume of the calibration suspension comprising the uniformly dispersed first and second nanoparticles to a sample buffer to generate a sample comprising a predetermined concentration of the first nanoparticles and the second nanoparticles in the sample buffer; analyzing the sample with a sizing instrument to obtain at least one data output regarding a fluorescence output of the first dye and a fluorescence output of the second dye; and adjusting one or more settings of the sizing instrument based on the at least one data output.

According to a ninth aspect disclosed herein, a method comprises the method according to the eighth aspect, wherein: the first nanoparticles have a first average diameter and a first polydispersity index of greater than or equal to 1.15 and less than or equal to 1.19; and the second nanoparticles have a second average diameter and a second polydispersity index of greater than or equal to 1.15 and less than or equal to 1.19.

According to a tenth aspect disclosed herein, a method comprises the method according to the eighth or ninth aspects, wherein the sizing instrument is a flow cytometer.

According to an eleventh aspect disclosed herein, a method comprises the method according to any of the eighth through tenth aspects, wherein adjusting the one or more settings comprises maximizing a signal, minimizing a coefficient of variation, or a combination thereof.

According to a twelfth aspect disclosed herein, a method comprises the method according to any of the eighth through eleventh aspects, wherein adjusting the one or more settings comprises adjusting a setting related to resolution limit of particle size measurement, range of particle size measurement, sensitivity of scatter photomultiplier tubes, baseline instrument noise, laser alignment, optical alignment, stability of a fluidics system of the flow cytometer, cell sorter drop delay, cell sorter efficiency, or combinations thereof.

According to a thirteenth aspect disclosed herein, a method comprises the method according to any of the eighth through twelfth aspects, wherein the first dye and the second dye each comprise a fluorescent lipophilic dye.

According to a fourteenth aspect disclosed herein, a method comprises the method according to any of the eighth through thirteenth aspects, wherein at least one of the first average diameter and the second average diameter is from 30 nm to 250 nm.

According to a fifteenth aspect disclosed herein, a method comprises the method according to any of the eighth through fourteenth aspects, wherein the first nanoparticles and the second nanoparticles each have a density of from 1.15 g/mL to 1.19 g/mL.

According to a sixteenth aspect disclosed herein, a calibration set comprises: a plurality of groups of nanoparticles comprising nylon-6, wherein each nanoparticle in a group of nanoparticles further comprises a dye that is different from a corresponding dye of a different group of nanoparticles, wherein: each group of nanoparticles has a corresponding average diameter and a polydispersity index of greater than or equal to 1.15 and less than or equal to 1.19; the corresponding average diameter of each group of nanoparticles differs from the corresponding average diameter of each of the other groups of nanoparticles in the plurality of groups by at least a factor of 2; and each corresponding average diameter is greater than or equal to 30 nm and less than or equal to 3000 nm.

According to a seventeenth aspect disclosed herein, a calibration set comprises the calibration set according to the sixteenth aspect, wherein each of the dyes comprises a fluorescent lipophilic dye.

According to an eighteenth aspect disclosed herein, a calibration set comprises the calibration set according to the sixteenth or seventeenth aspects, wherein the calibration set comprises a container comprising a mixture including the plurality of groups of nanoparticles.

According to a nineteenth aspect disclosed herein, a calibration set comprises the calibration set according to any one of the sixteenth through eighteenth aspects, wherein the plurality of groups of nanoparticles have a density of from 1.15 g/mL to 1.19 g/mL.

According to a twentieth aspect disclosed herein, a calibration set comprises the calibration set according to any one of the sixteenth through nineteenth aspects, wherein at least one of the plurality of groups of nanoparticles comprises RNA.

Additional features and advantages will be set forth in the detailed description, which follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 schematically illustrates groups of nanoparticles having different average diameters as compared to various extracellular vesicles according to one or more embodiments shown and described herein.

DETAILED DESCRIPTION

In various embodiments, a calibration set comprises first nanoparticles comprising nylon-6 covalently bound to a first dye and second nanoparticles comprising nylon-6 covalently bound to a second dye that is different from the first dye. The first nanoparticles have a first average diameter and a first polydispersity index of greater than or equal to 1.15 and less than or equal to 1.19, and the second nanoparticles have a second average diameter and a second polydispersity index of greater than or equal to 1.15 and less than or equal to 1.19. In various embodiments, the first average diameter is different from the second average diameter, and each of the first average diameter and the second average diameter are greater than or equal to 30 nm and less than or equal to 3000 nm, with the first average diameter being at least two times the second average diameter.

Reference will now be made in detail to various embodiments, examples of which are illustrated in the accompanying drawings. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim or embodiment does not actually recite an order to be followed by its steps, or that any apparatus claim or embodiment does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "formed from" can mean one or more of comprises, consists essentially of, or consists of For example, a component that is formed from a particular material can comprise the particular material, consist essentially of the particular material, or consist of the particular material.

Nanoparticles Including Nylon-6 and Fluorescent Lipophilic Dye

FIG. 1 schematically illustrates an embodiment of a calibration set 100 including a plurality of groups of nanoparticles 102, with each individual group being identified as 102a-102f, and reference numeral 102 referring generally to any one or more of the groups. The individual groups 102a-102f are shown as rows of individual nanoparticles, with a single nanoparticle from each group identified as 102a1-102f1, respectively. While the embodiment shown in FIG. 1 includes six groups of nanoparticles, it is contemplated that any number of groups of nanoparticles can be included in the calibration set 100.

Each group 102 comprises nanoparticles comprising nylon-6 covalently bound to a corresponding dye, such as an organic dye (e.g., fluorescein, rhodamine, aminomethylcoumarin (AMCA)), a biological fluorophore (e.g., green fluorescent protein, phycoerythrin, allophycocyanain), quantum dots, or a fluorescent lipophilic dye. Accordingly, in FIG. 1, the first group of nanoparticles 102a comprises nylon-6 covalently bound to a first dye, the second group of nanoparticles 102b comprises nylon-6 covalently bound to a second dye, the third group of nanoparticles 102c comprises nylon-6 covalently bound to a third dye, the fourth group of nanoparticles 102d comprises nylon-6 covalently bound to a fourth dye, the fifth group of nanoparticles 102e comprises nylon-6 covalently bound to a fifth dye, and the sixth group of nanoparticles 102f comprises nylon-6 covalently bound to a sixth dye. The dye in each group of nanoparticles is different from each of the other dyes in the other groups of nanoparticles such that the dye is unique to and indicative of the particular group of nanoparticles.

In various embodiments, each dye is a fluorescent lipophilic dye comprising a lipophilic carbocyanine dye. Suitable commercially available lipophilic carbocyanine dyes include, by way of example and not limitation, fluorescent lipophilic tracer dyes sold as DiB, DiA, DiO, DiI, DiD, and DiR, all available from Biotium, Inc. (Hayward, CA). The color, excitation maximum wavelength (λEx), and emission maximum wavelength (λEm) for each of these example dyes is presented in Table 1 below.

TABLE 1

| Dye | λEx (nm) | λEm (nm) | color |
| --- | --- | --- | --- |
| DiB | 353 | 442 | Blue |
| DiA | 456 | 590 | Yellow |
| DiO | 480 | 501 | Green |
| DiI | 549 | 565 | Red |

TABLE 1-continued

| Dye | λEx (nm) | λEm (nm) | color |
| --- | --- | --- | --- |
| DiD | 644 | 665 | Magenta |
| DiR | 750 | 780+ | infrared |

As shown in Table 1, the fluorescent lipophilic dyes have an excitation maximum wavelength (e.g., the peak wavelength in the excitation spectrum where the maximum absorption occurs) of from 353 nm to 750 nm as measured using a monochromator and, as such, the fluorescent lipophilic dyes in Table 1 are suitable for use in common sizing technologies, including but not limited to, flow cytometers, which incorporate optical systems such as lamps and lasers that produce light signals at the excitation maximum wavelength and can, therefore, excite the dyes. Moreover, Table 1 shows that each of the dyes exhibits a different emission maximum wavelength measured using a monochromator, which corresponds to the color that is observable in response to excitation. Accordingly, the use of multiple fluorescent dyes can enable increased sensitivity and resolution when each fluorescent dye is associated with nanoparticles having a corresponding average diameter.

In various embodiments, the dye is covalently bound to a polymer comprising nylon-6. In embodiments, the dye is bound to the polymer prior to the formation of the nanoparticles, as will be described in greater detail below, such that the dye is homogeneously distributed throughout the nanoparticle. Nylon-6 has the following structure:

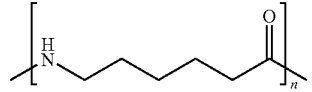

The carbonyl group of the nylon-6 structure enables covalent binding with the dye which, in addition to enabling the tracing of the nylon-6 nanoparticles, can also reduce or eliminate dye leakage or disassociation of the dye from the particles. For example, conventional standards which encapsulate or incubate polymer particles with the dye may not form direct chemical bonds between the dye and the particles. Accordingly, dye leaking from the particles can introduce error into measurements made using conventional standards. In contrast, in various embodiments, the fluorescent dyes described herein are covalently bound to the nylon-6 and incorporated into the nanoparticles and the polymer would have to degrade to release the fluorescent dye, thereby reducing the likelihood of disassociation of the dye from the nanoparticles.

In various embodiments, the nanoparticles have a density of greater than or equal to 1.15 g/mL and less than or equal to 1.19 g/mL, as measured in accordance with ASTM D792. For example, the nanoparticles have a density of greater than or equal to 1.15 g/mL and less than or equal to 1.19 g/mL, greater than or equal to 1.15 g/mL and less than or equal to 1.18 g/mL, greater than or equal to 1.15 g/mL and less than or equal to 1.17 g/mL, greater than or equal to 1.15 g/mL and less than or equal to 1.16 g/mL, greater than or equal to 1.16 g/mL and less than or equal to 1.19 g/mL, greater than or equal to 1.16 g/mL and less than or equal to 1.18 g/mL, greater than or equal to 1.16 g/mL and less than or equal to 1.17 g/mL, greater than or equal to 1.17 g/mL and less than or equal to 1.19 g/mL, greater than or equal to 1.17 g/mL and less than or equal to 1.18 g/mL, or greater than or equal to 1.18 g/mL and less than or equal to 1.19 g/mL. Accordingly, the nanoparticles have a density that is similar to the density of EVs (i.e., 1.15-1.19 g/mL) and measurably higher than the density of mammalian cells (i.e., 1.04-1.05 g/mL), thereby eliminating the issue of different material density between the EVs and the standard nanoparticles.

Each group of nanoparticles has an average hydrodynamic diameter (referred to herein as "average diameter"), determined in accordance with ISO 22412, which is generally referred to as dn. The average hydrodynamic diameter for each group of nanoparticles is determined by light scattering measurement techniques, such as dynamic light scattering (DLS) or nanoparticle tracking analysis (NTA) and visually confirmed via microscopy, such as scanning electron microscopy (SEM) or transmission electron microscopy (TEM). In FIG. 1, da is the average diameter of the first group of nanoparticles 102a, $d_b$ is the average diameter of the second group of nanoparticles 102b, $d_c$ is the average diameter of the third group of nanoparticles 102c, $d_d$ is the average diameter of the fourth group of nanoparticles 102d, $d_e$ is the average diameter of the fifth group of nanoparticles 102e, and $d_f$ is the average diameter of the sixth group of nanoparticles 102f.

In various embodiments, each group of nanoparticles has a standard deviation of size (e.g., a standard deviation of the maximum diameter of each of the particles in the group) of 15% or less, which is determined statistically via software calculations. For example, each group of nanoparticles may have a standard deviation of less than or equal to 15%, less than or equal to 12.5%, less than or equal to 10%, less than or equal to 8%, less than or equal to 6%, less than or equal to 5%, less than or equal to 4%, less than or equal to 3%, less than or equal to 2%, less than or equal to 1%, or less than or equal to 0.5%. In embodiments, the average diameter of each group of nanoparticles may have a standard deviation of greater than or equal to 0 and less than or equal to 15%, greater than or equal to 0 and less than or equal to 12.5%, greater than or equal to 0 and less than or equal to 10%, greater than or equal to 0 and less than or equal to 8%, greater than or equal to 0 and less than or equal to 6%, greater than or equal to 0 and less than or equal to 5%, greater than or equal to 0 and less than or equal to 4%, greater than or equal to 0 and less than or equal to 3%, greater than or equal to 0 and less than or equal to 2%, greater than or equal to 0 and less than or equal to 1%, greater than or equal to 0 and less than or equal to 0.5%, greater than or equal to 0.5% and less than or equal to 15%, greater than or equal to 0.5% and less than or equal to 12.5%, greater than or equal to 0.5% and less than or equal to 10%, greater than or equal to 0.5% and less than or equal to 8%, greater than or equal to 0.5% and less than or equal to 6%, greater than or equal to 0.5% and less than or equal to 5%, greater than or equal to 0.5% and less than or equal to 4%, greater than or equal to 0.5% and less than or equal to 3%, greater than or equal to 0.5% and less than or equal to 2%, greater than or equal to 0.5% and less than or equal to 1%, greater than or equal to 0 and less than or equal to 0.5%, greater than or equal to 1% and less than or equal to 15%, greater than or equal to 1% and less than or equal to 12.5%, greater than or equal to 1% and less than or equal to 10%, greater than or equal to 1% and less than or equal to 8%, greater than or equal to 1% and less than or equal to 6%, greater than or equal to 1% and less than or equal to 5%, greater than or equal to 1% and less than or equal to 4%, greater than or equal to 1% and less than or equal to 3%, or greater than or equal to 1% and less than or equal to 2%, including any and all ranges and sub-ranges within these ranges. It is contemplated that, in embodiments, each standard deviation can be a number within this range, and may be the same as or different from the standard deviation of one or more other groups of nanoparticles.

In various embodiments, each group of nanoparticles can be further characterized by a polydispersity index of greater than or equal to 1.15 and less than or equal to 1.19. The polydispersity index (sometimes referred to as the "PDI" or Đ) is a measure of the broadness of the size distribution calculated from the cumulants analysis of the group of nanoparticles and is determined using dynamic light scattering (DLS) in compliance with ISO 22412 and ISO 13321. In embodiments, each group of nanoparticles may have a PDI of greater than or equal to 1.15 and less than or equal to 1.18, greater than or equal to 1.15 and less than or equal to 1.17, greater than or equal to 1.15 and less than or equal to 1.16, greater than or equal to 1.16 and less than or equal to 1.19, greater than or equal to 1.16 and less than or equal to 1.18, greater than or equal to 1.16 and less than or equal to 1.17, greater than or equal to 1.17 and less than or equal to 1.19, greater than or equal to 1.17 and less than or equal to 1.17, or greater than or equal to 1.18 and less than or equal to 1.19, including any and all ranges and sub-ranges within these ranges. It is contemplated that, in embodiments, each PDI can be a number within this range, and may be the same as or different from the PDI of one or more other groups of nanoparticles.

The average diameter $d_n$ of each group is different from the average diameter of each of the other groups of nanoparticles. Accordingly, in FIG. 1, $d_a$ is different from $d_b$, $d_c$, $d_d$, $d_e$, and $d_f$; $d_b$ is different from $d_c$, $d_d$, $d_e$, and $d_f$; $d_c$ is different from $d_d$, $d_e$, and $d_f$; $d_d$ is different from $d_e$ and $d_f$; and $d_e$ is different from $d_f$. In various embodiments, each average diameter is at least two times the next largest average diameter. For example, in FIG. 1, $d_b$ (100 nm) is two times $d_a$ (50 nm), $d_c$ (250 nm) is at least two times $d_b$ (100 nm), $d_d$ (500 nm) is two times $d_c$ (250 nm), $d_e$ (1000 nm) is two times $d_d$ (500 nm), and $d_f$ (2000 nm) is two times $d_e$ (1000 nm).

In various embodiments, each average diameter $d_n$ is independently greater than or equal to 30 nm and less than or equal to 3000 nm. For example, each average diameter $d_n$ can be greater than or equal to 30 nm and less than or equal to 3000 nm, greater than or equal to 30 nm and less than or equal to 2500 nm, greater than or equal to 30 nm and less than or equal to 2000 nm, greater than or equal to 30 nm and less than or equal to 1500 nm, greater than or equal to 30 nm and less than or equal to 1000 nm, greater than or equal to 30 nm and less than or equal to 750 nm, greater than or equal to 30 nm and less than or equal to 500 nm, greater than or equal to 30 nm and less than or equal to 300 nm, greater than or equal to 30 nm and less than or equal to 250 nm, greater than or equal to 30 nm and less than or equal to 100 nm, greater than or equal to 50 nm and less than or equal to 3000 nm, greater than or equal to 50 nm and less than or equal to 2500 nm, greater than or equal to 50 nm and less than or equal to 2000 nm, greater than or equal to 50 nm and less than or equal to 1500 nm, greater than or equal to 50 nm and less than or equal to 1000 nm, greater than or equal to 50 nm and less than or equal to 750 nm, greater than or equal to 50 nm and less than or equal to 500 nm, greater than or equal to 50 nm and less than or equal to 300 nm, or greater than or equal to 50 nm and less than or equal to 250 nm, including any and all ranges and sub-ranges within these ranges. In embodiments, at least one group of nanoparticles has an average diameter less than or equal to 300 nm, less than or equal to 250 nm, less than or equal to 200 nm, less than or equal to 150 nm, less than or equal to 100 nm, less than or equal to 75 nm, or less than or equal to 50 nm.

It should be appreciated that although the groups 102a-102f shown in FIG. 1 have particular average diameters, the average diameters in the calibration set 100 can vary depending on the particular embodiment. For example, one or more groups of nanoparticles can be selected to have an average diameter that is relatively close in range (within 50 nm, within 100 nm, or within 250 nm) to a type of EV of interest. In addition to showing the calibration set 100, FIG. 1 also schematically illustrates various types of EVs 104 and their approximate average diameters. In particular, FIG. 1 includes exosomes 106, which have an average diameter of less than or equal to about 100 nm, a first set of microvesicles 108 having an average diameter of greater than or equal to about 100 nm and less than or equal to about 1000 nm, a second set of microvesicles 110 having an average diameter of greater than or equal to about 1000 nm and less than or equal to about 2000 nm, and oncosomes 112 having an average diameter of greater than about 2000 nm. Accordingly, as shown in FIG. 1, the nanoparticles described herein can be used to approximate the size of various different EVs.

In some embodiments, one or more groups of nanoparticles may include RNA. In such embodiments, as will be described in greater detail below, the RNA is bound to the polymer via the amide group of the polymer prior to formation of the nanoparticle. Accordingly, RNA is homogenously distributed throughout each nanoparticle. As used herein, the phrase "RNA molecule" or "RNA" refers to ribonucleic acid, i.e., a polymer consisting of nucleotides. The nucleotides are usually adenosine-monophosphate, uridine-monophosphate, guanosine-monophosphate, and cytidine-monophosphate monomers which are connected to each other along a so-called backbone formed by phosphodiester bonds between the sugar (i.e., ribose) of a first monomer and a phosphate moiety of a second, adjacent monomer. In embodiments in which nanoparticles include RNA, the RNA may possess any predetermined RNA sequence. The RNA sequence can be, for example a generic RNA sequence, or a specific sequence of interest. Accordingly, results of analysis could be validated by adding the nanoparticles including RNA into a biologic sample and observing the effects of technical steps throughout the experimental protocol, as will be described in greater detail below.

Methods of Making Nanoparticles

The nanoparticles of various embodiments can be made in accordance with any one of a number of methods of nanoprecipitation, including, but not limited to, pipette droplet nanoprecipitation, flow-controlled T-mixer nanoprecipitation, and flow-controlled microfluidics nanoprecipitation. In general, to formulate nanoparticles, nylon-6 pellets are dissolved in a polar protic solvent (e.g., acetic acid, formic acid, ethanol, etc.) or a polar aprotic solvent (e.g., tetrahydrofuran, acetone, acetonitrile, etc.) until homogenous (e.g., the nylon-6 is uniformly distributed throughout the solvent). The dye is dissolved into the nylon-6 and solvent mixture or introduced via a miscible solvent via emulsion. An aqueous mixture of water and surfactant (e.g., polyvinyl alcohol, pluronic, or another aggregation protectant) is prepared for both mixing and collecting solutions.

In various embodiments, the size of the nanoparticles is controlled by controlling the polymer concentration in the organic phase, the organic solvent choice, the surfactant concentration in the aqueous phase, the surfactant choice, the ratio of the organic phase to the aqueous phase in mixing, the flow rates of the organic phase and aqueous phase during mixing, and the apparatus used for nanoprecipitation. For example, increasing the polymer concentration in the organic phase or an increase in the ratio of organic phase to the aqueous phase in mixing results in an increase in particle diameter. As another example, an increase in surfactant concentration in the aqueous phase or an increase in aqueous phase to organic phase results in a decrease in particle diameter. The organic solvent and surfactant choice can have various effects that could be determined empirically in particle size depending on the chemical densities, charges, miscibility, and other chemical properties of the solvent or surfactants themselves. An increase in flow rates during mixing can also impact the particle diameter (generally, higher flow rates results in a decrease in particle diameter). However, the flow rates for organic and aqueous phase can be changed independently which may have a different effect similar to that described with their changes associated with ratio in the mixture.

Moreover, the particular method for forming the nanoparticles can impact the variability of particle size. The more control in the apparatus, the more accurate and precise the target particle size can be achieved. For example, the flow-controlled microfluidic method will be able to produce particles with a smaller PDI than the T-mixer, and the T-mixer will be able to produce particles with a smaller PDF than the pipette method.

In embodiments in which the pipette droplet method is used to prepare the nanoparticles, a small amount of polymer (e.g., greater than or equal to 0.5% and less than or equal to 2.0% w/v of nylon-6) is dissolved into organic solvent along with the fluorescent lipophilic dye. In embodiments, the fluorescent is added in an amount of greater than or equal to 0.25% and less than or equal to 1.5% w/w dye/polymer, and the ratio of polymer to dye is greater than or equal to 50:1 and less than or equal to 250:1. In particular embodiments, the ratio of polymer to dye is approximately 100:1. In embodiments in which the dye is not soluble in the organic solvent, an emulsion is made by dissolving the dye in a miscible solvent (e.g., dimethyl sulfoxide (DMSO)) and added to the organic phase while vortexing or sonicating until a homogeneous solution is achieved. Next, the organic phase containing the polymer and dye is added dropwise to the aqueous phase while stirring. In embodiments, the aqueous phase is greater than or equal to 0.5% and less than or equal to 5.0% w/v surfactant in water. The organic solvent is then removed via evaporation. In embodiments, evaporation can be performed by stirring (e.g., for at least 3 hours) or through the use of a rotary evaporator (e.g., for about 15 minutes).

Nanoparticles are recovered from the aqueous medium by centrifugation. In embodiments, the aqueous medium can be centrifuged at about 16,000×g for about 15 minutes at room temperature. The aqueous supernatant is decanted and the nanoparticle pellet is washed by resuspending the nanoparticles in 10 mL of water and centrifuging at about 16,000×g for about 15 minutes at room temperature. In embodiments, the washing procedure can be performed two or more times. Finally, the washed dispersion is lyophilized for at least 48 hours to yield freeze-dried nanoparticles. The nanoparticles can be stored at a temperature of −20° C. until needed.

In embodiments in which the flow-controlled T-mixer method or flow-controlled microfluidic method is used to prepare the nanoparticles, nylon-6 and fluorescent lipophilic dye are dissolved into organic solvent at a concentration of about 50 mg/mL nylon-6 and 0.5% w/w dye to polymer. An aqueous phase is also prepared by adding greater than or equal to 0.5% and less than or equal to 5.0% w/v surfactant in water. Each phase is put into a reservoir which, in various embodiments, is a syringe. In embodiments in which a T-mixer method is used, each syringe is mounted on a syringe pump with an output line of the syringe leading to one entrance port of a T-mixer. A collection vessel is positioned at the exit port of the T-mixer. Using an empirically-determined flow rate, the syringe pumps are programmed to deliver the appropriate flow and volumes of each phase simultaneously to the T-mixer. In embodiments in which a flow-controlled microfluidic method is used, organic and aqueous phases are provided to a microfluidic chip at empirically-determined rates. Nanoparticles are recovered and washed as described above.

It is contemplated that adjustments and modifications may be made to the methods for preparing the nanoparticles described herein, including, for example, amounts of ingredients, times of centrifugation, and the like, depending on the particular embodiment, and, for example, based on the desired size of nanoparticles to be formed.

In embodiments in which RNA is incorporated into the nanoparticles, the RNA molecules can be added into the aqueous phase of the mixtures described above. In such embodiments, the aqueous phase includes a slightly acidic buffer (e.g., sodium acetate or tris-EDTA) to facilitate the interaction of the amide group in the nylon-6 and the RNA. In embodiments, the pH of the aqueous phase is greater than or equal to 4.5 and less than or equal to 7.

In various embodiments, groups of nanoparticles can be filtered using size exclusion centrifuge filters or other size selection methods in order to achieve desired size distributions.

Although various methods for forming nanoparticles comprising nylon-6 and dye have been described, it should be understood that other methods known to those skilled in the art may be used to manufacture the nanoparticles, including, but not limited to, emulsion techniques, electrospraying, and plasma deposition.

In various embodiments, two or more groups of nanoparticles are added in equal volumes to a single vessel, such as a vial, to form a standard set. In embodiments, the nanoparticles may be resuspended by adding water or another solvent prior to use. It is believed that by storing the nanoparticles in a concentrated state may prolong the shelf life of the nanoparticles by limiting hydrolytic degradation of the polymer that may occur when the nanoparticles are suspended in water.

Methods of Use of Nanoparticles

The nanoparticles of various embodiments can be used in a variety of ways and can, for example, be used to characterize small biologic vesicles, such as various EVs. For example, in some embodiments, the nanoparticles are used as standards that are spiked into biological samples to assess isolation efficiency and furnish technical normalization. In some embodiments, nanoparticles loaded with a particular RNA sequence can enable independent validation of results, such as by demonstrating that a particular isolation method retains function (e.g., RNA transfer capacity) of isolated EVs. As another example, the nanoparticles are used as calibration standards for EV quantitation and sizing technologies, including but not limited to, flow cytometry.

In embodiments, the calibration set can be used to calibrate a sizing instrument, such as a flow cytometer. Accordingly, a method for calibrating a sizing instrument includes uniformly dispersing first nanoparticles and second nanoparticles in a calibration suspension. The first nanoparticles include a first dye, and the second nanoparticles include a second dye that is different from the first dye. Next, a volume of the calibration suspension comprising the uniformly dispersed first and second nanoparticles is added to a sample buffer to generate a sample comprising a predetermined concentration of the first nanoparticles and the second nanoparticles in the sample buffer.

The sample is analyzed with a sizing instrument (e.g., Guava® easyCyte™ Flow Cytometer from Luminex or Attune™0 NxT Flow Cytometer from Thermo Fisher) to obtain at least one data output regarding a fluorescence output of the first dye and a fluorescence output of the second dye. Next, one or more settings of the sizing instrument are adjusted based on the at least one data output. In embodiments, adjusting the one or more settings can include maximizing a signal, minimizing a coefficient of variation, or a combination thereof. In some embodiments, the setting that is adjusted may be related to resolution limit of particle size measurement, range of particle size measurement, sensitivity of scatter photomultiplier tubes, baseline instrument noise, laser alignment, optical alignment, stability of a fluidics system of the flow cytometer, cell sorter drop delay, cell sorter efficiency, or combinations thereof. Other adjustments are contemplated, depending on the particular embodiment, and will be based, at least in part, on the particular sizing instrument being calibrated.

In embodiments in which the nanoparticles include RNA, the nanoparticles may be used as artificial EV spike-in standards to standardize recovery of EV and associated RNA from biofluids and to facilitate independent verification of results. In such embodiments, the artificial EV standard may be used to confirm that the RNA is not damaged by the experimental protocol. Experimental protocols can include, for example, ribogreen assays or other quantification assays, or functional assays, as will be appreciated by those skilled in the art.

In various embodiments described herein, the calibration set includes groups of nanoparticles of nylon-6 and a corresponding dye, each of which has a corresponding average diameter. Accordingly, the nanoparticles exhibit a density, light scattering effects, and a size range comparable to EVs, making them particularly well-suited for use as standards in EV research. Moreover, the nanoparticles of various embodiments may include RNA molecules to enable the nanoparticles to be used as an artificial EV spike in experimental protocols to facilitate independent verification of results and to standardize recovery of EVs and associated RNA.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A calibration set, comprising:
   first nanoparticles comprising nylon-6 covalently bound to a first dye, the first nanoparticles having a first average diameter and a first polydispersity index of greater than or equal to 1.15 and less than or equal to 1.19; and
   second nanoparticles comprising nylon-6 covalently bound to a second dye that is different from the first dye, the second nanoparticles having a second average diameter and a second polydispersity index of greater than or equal to 1.15 and less than or equal to 1.19, wherein:
the first average diameter is different from the second average diameter;
the first average diameter and the second average diameter are each independently greater than or equal to 30 nm and less than or equal to 3000 nm; and
the first average diameter is at least two times the second average diameter.

2. The calibration set according to claim 1, wherein the first dye and the second dye each comprise a fluorescent lipophilic dye.

3. The calibration set according to claim 1, wherein:
the first dye comprises a first excitation maximum wavelength, $\lambda Ex1$;
the second dye comprises a second excitation maximum wavelength, $\lambda Ex2$;
$\lambda Ex1$ is different from $\lambda Ex2$; and
$\lambda Ex1$ and $\lambda Ex2$ are each from to 350 nm to 750 nm.

4. The calibration set according to claim 1, wherein the calibration set comprises a container comprising a mixture including both the first nanoparticles and the second nanoparticles.

5. The calibration set according to claim 1, wherein at least one of the first average diameter and the second average diameter is from 30 nm to 250 nm.

6. The calibration set according to claim 1, wherein the first nanoparticles and the second nanoparticles each have a density of from 1.15 g/mL to 1.19 g/mL.

7. The calibration set according to claim 1, wherein the first nanoparticles and the second nanoparticles each comprise RNA.

8. A method of using a calibration set, the method comprising:
uniformly dispersing first nanoparticles and second nanoparticles in a calibration suspension, the first nanoparticles comprising nylon-6 covalently bound to a first dye, and the second nanoparticles comprising nylon-6 covalently bound to a second dye that is different from the first dye;
adding a volume of the calibration suspension comprising the uniformly dispersed first and second nanoparticles to a sample buffer to generate a sample comprising a predetermined concentration of the first nanoparticles and the second nanoparticles in the sample buffer;
analyzing the sample with a sizing instrument to obtain at least one data output regarding a fluorescence output of the first dye and a fluorescence output of the second dye; and
adjusting one or more settings of the sizing instrument based on the at least one data output.

9. The method of claim 8, wherein:
the first nanoparticles have a first average diameter and a first polydispersity index of greater than or equal to 1.15 and less than or equal to 1.19; and
the second nanoparticles have a second average diameter and a second polydispersity index of greater than or equal to 1.15 and less than or equal to 1.19.

10. The method of claim 8, wherein the sizing instrument is a flow cytometer.

11. The method of claim 10, wherein adjusting the one or more settings comprises maximizing a signal, minimizing a coefficient of variation, or a combination thereof.

12. The method of claim 10, wherein adjusting the one or more settings comprises adjusting a setting related to resolution limit of particle size measurement, range of particle size measurement, sensitivity of scatter photomultiplier tubes, baseline instrument noise, laser alignment, optical alignment, stability of a fluidics system of the flow cytometer, cell sorter drop delay, cell sorter efficiency, or combinations thereof.

13. The method of claim 8, wherein the first dye and the second dye each comprise a fluorescent lipophilic dye.

14. The method of claim 8, wherein at least one of the first average diameter and the second average diameter is from 30 nm to 250 nm.

15. The method of claim 8, wherein the first nanoparticles and the second nanoparticles each have a density of from 1.15 g/mL to 1.19 g/mL.

16. A calibration set, comprising:
a plurality of groups of nanoparticles comprising nylon-6, wherein each nanoparticle in a group of nanoparticles further comprises a dye that is different from a corresponding dye of a different group of nanoparticles, wherein:
each group of nanoparticles has a corresponding average diameter and a polydispersity index of greater than or equal to 1.15 and less than or equal to 1.19;
the corresponding average diameter of each group of nanoparticles differs from the corresponding average diameter of each of the other groups of nanoparticles in the plurality of groups by at least a factor of 2; and
each corresponding average diameter is greater than or equal to 30 nm and less than or equal to 3000 nm.

17. The calibration set according to claim 16, wherein each of the dyes comprises a fluorescent lipophilic dye.

18. The calibration set according to claim 16, wherein the calibration set comprises a container comprising a mixture including the plurality of groups of nanoparticles.

19. The calibration set according to claim 16, wherein the plurality of groups of nanoparticles have a density of from 1.15 g/mL to 1.19 g/mL.

20. The calibration set according to claim 16, wherein at least one of the plurality of groups of nanoparticles comprises RNA.

* * * * *